(12) United States Patent
Ogihara

(10) Patent No.: US 9,825,332 B2
(45) Date of Patent: Nov. 21, 2017

(54) ELECTROLYTIC SOLUTION FOR LITHIUM ION SECONDARY BATTERY, AND LITHIUM ION SECONDARY BATTERY

(71) Applicant: NISSAN MOTOR CO., LTD., Kanagawa (JP)

(72) Inventor: Wataru Ogihara, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/387,583

(22) PCT Filed: Mar. 5, 2013

(86) PCT No.: PCT/JP2013/056003
§ 371 (c)(1),
(2) Date: Sep. 24, 2014

(87) PCT Pub. No.: WO2013/150850
PCT Pub. Date: Oct. 10, 2013

(65) Prior Publication Data
US 2015/0155595 A1 Jun. 4, 2015

(30) Foreign Application Priority Data

Apr. 2, 2012 (JP) ................................. 2012-083801
Mar. 1, 2013 (JP) ................................. 2013-040802

(51) Int. Cl.
*H01M 10/0567* (2010.01)
*H01M 4/505* (2010.01)
(Continued)

(52) U.S. Cl.
CPC ........ *H01M 10/0567* (2013.01); *H01G 11/50* (2013.01); *H01G 11/64* (2013.01);
(Continued)

(58) Field of Classification Search
CPC .......................... H01M 10/05; H01M 10/0564
See application file for complete search history.

(56) References Cited

U.S. PATENT DOCUMENTS 4,933,106 A * 6/1990 Sakai et al. .................. 252/500
5,665,492 A * 9/1997 Sotomura ..................... 429/213
(Continued)

FOREIGN PATENT DOCUMENTS

CN     101714460 A    5/2010
EP     1142834 A1    10/2001
(Continued)

OTHER PUBLICATIONS

Li et al. "Research on a gel polymer electrolyte for Li-ion batteries." Pure Appl. Chem., vol. 80, No. 11, pp. 2553-2563, 2008.*
(Continued)

*Primary Examiner* — Alix Eggerding
(74) *Attorney, Agent, or Firm* — Young Basile Hanlon & MacFarlane, P.C.

(57) ABSTRACT

An electrolytic solution for lithium ion secondary batteries contains: a lithium salt electrolyte; an organic solvent; and an aliphatic compound having three or more carboxylic acid groups in a molecule.
A lithium ion secondary battery includes: a cathode including a cathode active material that is capable of absorbing and releasing lithium and contains manganese (Mn) as a major transit metal species; an anode; and a non-aqueous electrolytic solution. The electrolytic solution is the above-described solution. The aliphatic compound has a molecular weight within the range from 50,000 to 500,000.

9 Claims, 1 Drawing Sheet

Number of carboxylic acid groups of additive in a molecule and capacity retention after 100 cycles

(51) Int. Cl.

| | |
|---|---|
| *H01M 4/525* | (2010.01) |
| *H01M 10/052* | (2010.01) |
| *H01G 11/50* | (2013.01) |
| *H01G 11/64* | (2013.01) |
| *H01M 4/38* | (2006.01) |
| *H01M 4/583* | (2010.01) |
| *H01M 10/0525* | (2010.01) |
| *H01G 11/06* | (2013.01) |
| *H01M 4/587* | (2010.01) |

(52) U.S. Cl.
  CPC .......... *H01M 4/386* (2013.01); *H01M 4/505* (2013.01); *H01M 4/525* (2013.01); *H01M 4/583* (2013.01); *H01M 10/052* (2013.01); *H01M 10/0525* (2013.01); *H01G 11/06* (2013.01); *H01M 4/587* (2013.01); *H01M 2300/0025* (2013.01); *Y02E 60/13* (2013.01)

(56) References Cited

U.S. PATENT DOCUMENTS

| | | | |
|---|---|---|---|
| 2002/0018937 A1* | 2/2002 | Noh | H01M 10/0431 429/303 |
| 2005/0147889 A1* | 7/2005 | Ohzuku | H01M 4/131 429/231.1 |
| 2011/0171539 A1 | 7/2011 | Patoux et al. | |
| 2012/0009465 A1* | 1/2012 | Kato et al. | 429/166 |
| 2012/0141884 A1 | 6/2012 | Takahata | |

FOREIGN PATENT DOCUMENTS

| | | |
|---|---|---|
| JP | 2005072182 A | 3/2005 |
| JP | 2009517836 A | 4/2009 |
| JP | 2011526057 A | 9/2011 |
| JP | 2012089402 A | 5/2012 |
| JP | 2013016303 A | 1/2013 |
| WO | 2008150134 A1 | 12/2008 |
| WO | 2011024251 A1 | 3/2011 |
| WO | 2012156903 A1 | 11/2012 |

OTHER PUBLICATIONS

Communication and extended European search report dated Feb. 11, 2015 from the corresponding EP Application No. 13772369.8.
Translation of the Written Opinion of the International Searching Authority dated May 14, 2013, for International Application No. PCT/JP2013/056003.
Rogovina, L. Z., et al., Definition of the Concept of Polymer Gel, Polymer Science, Ser. C, 2008, pp. 85-92, vol. 50, No. 1.
Grillet, et al., Polymer Gel Rheology and Adhesion, InTech Rheology, Mar. 7, 2012, pp. 59-80.
Baohong Chen, et al., Highly Stretchable and Transparent Ionogels as Nonvolatile Conductors for Dielectric Elastomer Transducers, ACS Applied Materials & Interfaces, Apr. 2014, pp. 7840-7845.
T. Minami, et al., Solid State Ionics for Batteries, 5.4 Conclusions, p. 185, Apr. 19, 2006, Springer.
Yuya Yamashita, et al., Polymer Synthetic Chemistry, Tokyo Denki University Press, Aug. 1995, p. 268, Tokyo Denki University.

* cited by examiner

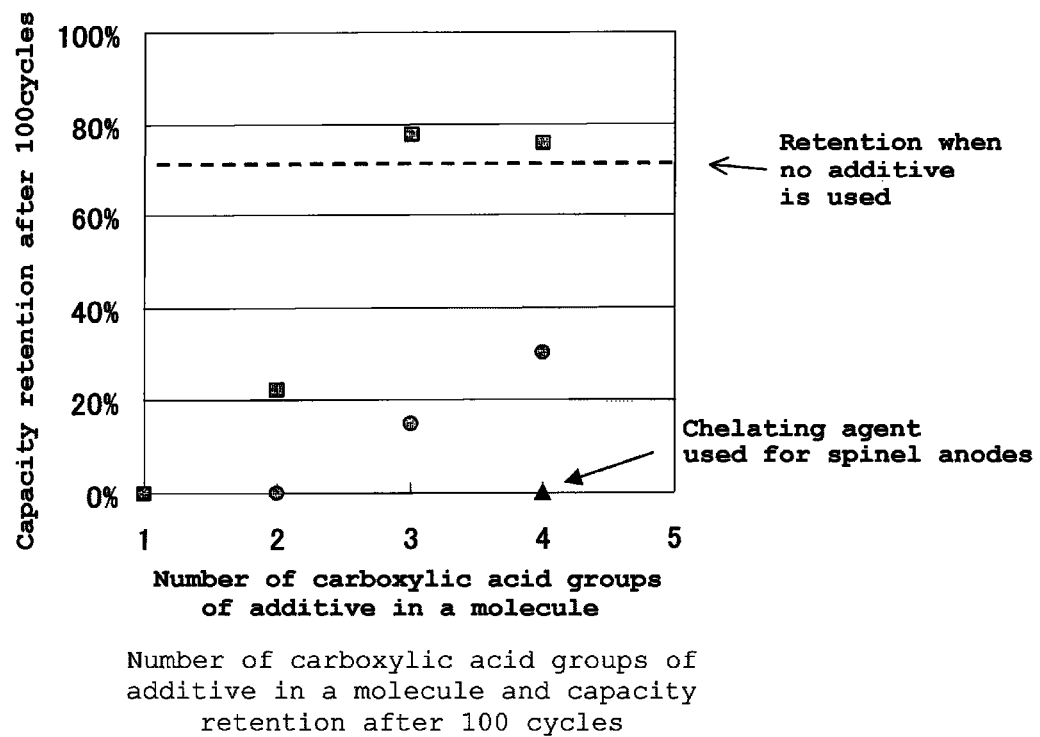
Number of carboxylic acid groups of additive in a molecule and capacity retention after 100 cycles

ELECTROLYTIC SOLUTION FOR LITHIUM ION SECONDARY BATTERY, AND LITHIUM ION SECONDARY BATTERY

CROSS REFERENCE TO RELATED APPLICATIONS

The present application claims priority to Japanese Patent Application Nos. 2012-083801, filed Apr. 2, 2012 and 2013-040802, filed Mar. 1, 2013, each incorporated herein in its entirety.

TECHNICAL FIELD

The present invention relates to an electrolytic solution for lithium ion secondary batteries and a lithium ion secondary battery, in more detail, to non-aqueous electrolytic solution for lithium ion secondary batteries that can increase the charge capacity and can improve the cycling characteristics of a lithium ion secondary battery, and a lithium ion secondary battery using the electrolytic solution.

BACKGROUND

Lithium-rich layered cathodes having a $Li_2MnO_3$ base structure, which contributes to high capacity, have been used for cathodes of lithium ion secondary batteries (for example, see Japanese Patent Unexamined Publication No. 2009-517836.

SUMMARY

However, such lithium-rich layered cathodes sometimes suffer from elution of a transit metal component (manganese) causing manganese adsorption on anodes and the like, which results in degradation of the battery performance.

The present invention was made in consideration of such problems with the prior art, and an object thereof is to provide an electrolytic solution for lithium ion secondary batteries that can suppress anode degradation, can increase charge capacity, and can improve cycling characteristics, and a lithium ion secondary battery using the electrolytic solution.

As a result of diligent study for achieving the above objects, the present inventors found that the above-described problem can be solved by adding an aliphatic compound having three or more carboxylic acid groups in a molecule. The present invention was thus completed.

That is, the electrolytic solution for lithium ion secondary batteries of the present invention is characterized by containing a lithium salt electrolyte, an organic solvent, and an aliphatic compound having three or more carboxylic acid groups in a molecule.

Further, the lithium ion secondary battery of the present invention includes a cathode including a cathode active material which contains manganese (Mn) as a major transit metal species and is capable of absorbing and releasing lithium, an anode, and a non-aqueous electrolytic solution. The lithium ion secondary battery is characterized in that the non-aqueous electrolytic solution contains an organic solvent, a lithium salt electrolyte, and an aliphatic compound having three or more carboxylic acid groups in a molecule.

According to the present invention, inclusion of the compound having three or more carboxylic acid groups in a molecule makes it possible to provide an electrolytic solution for lithium ion secondary batteries that can suppress anode degradation, can increase charge capacity and can improve cycling characteristics, and a lithium ion secondary battery using the electrolytic solution.

BRIEF DESCRIPTION OF DRAWINGS

FIG. 1 is a graph illustrating the relationship between the number of carboxylic acid group(s) of a compound in a molecule and the capacity retention after 100 cycles of a battery using an electrolytic solution containing the compound.

DESCRIPTION OF THE EMBODIMENTS

Hereinafter, an electrolytic solution for lithium ion secondary batteries of the present invention will be described.

The electrolytic solution for lithium ion secondary batteries of the present invention is a non-aqueous electrolytic solution that contains a lithium salt electrolyte, an organic solvent and an aliphatic compound having three or more carboxylic acid groups in a molecule.

Such lithium salt electrolytes include e.g. alkali metal salts, including lithium hexafluorophosphate ($LiPF_6$).

Examples of such organic solvents include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), fluoroethylene carbonate (FEC) and the like. They may be used alone or in combination. These organic solvents are useful for dissolving the above-described lithium salt electrolyte.

Further, such aliphatic compounds having three or more carboxylic acid groups in a molecule include a variety of aliphatic compounds. Citric acid, cyclobutane tetracarboxylic acid, cyclopentane tetracarboxylic acid, polyacrylic acid and the like are preferably used. However, in the present invention, it should be noted that the aliphatic compounds do not include aminocarboxylic acids.

The above-described aliphatic compound may also be a high molecular weight compound such as polyacrylic acid and polyglutamic acid, and the molecular weight thereof is within a range preferably from 50,000 to 500,000, more preferably from 100,000 to 450,000. It is assumed this is because low molecular weight tends to cause high acidity. Also, it is assumed this is because high molecular weight makes it difficult to dissolve the compound in the electrolytic solution of a battery and to solvate the carboxylic acid groups located on high molecule side chains, and thereby cancels the effects as an additive.

So far the detailed mechanism of how the usage of the aliphatic compound gives good advantageous effects in the present invention is presumed as follows, although it has not been completely revealed yet. That is, since the transit metal ions eluted from a cathode have a higher oxidation-reduction potential than lithium ions ($Li^+$), they reach an anode before $Li^+$ to cause an adverse effect on the battery performance. Since polybasic acids having a plurality of carboxylic acid groups in a molecule selectively trap multivalent cations rather than monovalent cations, the aliphatic compound dissolved in the electrolytic solution can selectively trap the transit metal ions (multivalent cations), such as Mn, which elute from the anode, from the electrolytic solution containing $Li^+$.

In the present invention, it is presumed that transit metal ions are prevented from reaching an anode layer by the above-described mechanism, and degradation of anode performance can be thus prevented. As a result, it becomes possible to increase the charge capacity and to improve the cycling characteristics of the battery.

In the electrolytic solution for lithium ion batteries of the present invention, the content of the above-described aliphatic compound is preferably, but not limited to, within the range from 0.1 to 3 mass % with respect to the whole electrolyte solution. If it is less than 0.1 mass %, eluted transit ions may not be efficiently trapped with this small amount. If it is more than 3 mass %, the lithium ions in the electrolytic solution may be inhibited from ionization or ion migration, which may cause a side reaction to degrade the battery performance.

The electrolytic solution for lithium ion secondary batteries of the present invention may contain an additive or the like in addition to the above-described components. Examples of such additives include additives that can form a solid electrolyte interphase coating (SEI coating) on the surface of an anode active material, such as organic sulfone compounds, organic disulfone compounds, vinylene carbonate derivatives, ethylene carbonate derivatives, ester derivatives, divalent phenol derivatives, terphenyl derivatives, phosphate derivatives, and the combinations thereof.

Such organic sulfone compounds include sultone derivatives and cyclic sulfonic acid esters, such as 1,3-propane sultone (saturated sultone) and 1,3-propene sultone (unsaturated sultone).

Such organic disulfone compounds include disultone derivatives and cyclic disulfonic acid esters, such as methylene methane disulfonate.

Such vinylene carbonate derivatives include vinylene carbonate (VC), and such ethylene carbonate derivatives include fluoroethylene carbonate (FEC).

Examples of such ester derivatives include 4-biphenylyl acetate, 4-biphenylyl benzoate, 4-biphenylylbenzyl carboxylate and 2-biphenylyl propionate.

Examples of such divalent phenol derivatives include 1,4-diphenoxybenzene and 1,3-diphenoxybenzene.

Such ethylene glycol derivatives include 1,2-diphenoxyethane, 1-(4-biphenylyloxy)-2-phenoxyethane and 1-(2-biphenylyloxy)-2-phenoxyethane.

Such terphenyl derivatives include o-terphenyl, m-terphenyl, p-terphenyl, 2-methyl-o-terphenyl and 2,2-dimethyl-o-terphenyl, and such phosphate derivatives include triphenylphosphate and the like.

Next, the lithium ion secondary battery of the present invention will be described.

(Cathode) Any type of cathode containing a cathode active material that is capable of absorbing and releasing lithium and contains manganese (Mn) as a major transit metal species may be used.

In the present invention, the cathode active material is preferably a material represented by the following chemical formula (1):

$$Li_{(2-0.5x)}Mn_{1-x}M_{1.5x}O_3 \quad (1)$$

where x satisfies $0.1 \leq x \leq 0.5$ and M is $Ni_\alpha Co_\beta Mn_\gamma$ (where $\alpha$, $\beta$, $\gamma$ and $\sigma$ range $0<\alpha \leq 0.5$, $0 \leq \beta \leq 0.33$ and $0<\gamma \leq 0.5$, and satisfy $\alpha+\beta+\gamma=1$).

Alternatively, the cathode active material may be a material represented by the following chemical formula (2):

$$Li_{(2-0.5x)}Mn_{1-x}M_{1.5x}O_3 \quad (2)$$

where x satisfies $0.1 \leq x \leq 0.5$ and M is $Ni_\alpha Co_\beta Mn_\gamma M^1_\sigma$ (where $M^1$ is at least one selected from the group consisting of aluminum (Al), iron (Fe), copper (Cu), magnesium (Mg) and titanium (Ti), and $\alpha$, $\beta$, $\gamma$ and $\sigma$ range $0<\alpha \leq 0.5$, $0 \leq \beta \leq 0.33$, $0<\gamma \leq 0.5$ and $0 \leq \sigma \leq 0.1$, and satisfy $\alpha+\beta+\gamma+\sigma=1$).

(Anode) Any type of anode including an anode active material that contains silicon (Si) or carbon (C) as a major structural element may be used.

(Non-aqueous electrolytic solution and the like) The above-described electrolytic solution for lithium ion secondary batteries of the present invention is used as the non-aqueous electrolytic solution. The separator and the like may be ones known in the art. The housing container of the battery element and the like are not specifically limited, and the shape of the battery may be of any type such as laminate battery, coin-cell battery and bipolar-type battery.

EXAMPLES

Hereinafter, the present invention will be described in more detail with inventive examples and comparative examples. However, the present invention is not limited to those examples.

Inventive Examples 1 to 7

(Preparation of Anode) An anode slurry was prepared by blending graphite powder, acetylene black as an conductive additive and PVDF as a binder together in an mass ratio of 90:5:5, and then adding and mixing thereto N-methylpyrrolidone as a solvent. A copper foil was used as a current collector. The obtained anode slurry was applied thereto to a thickness of 30 μm, and was sufficiently dried. The slurry was dried in vacuo for 24 hours to obtain the desired anode.

(Preparation of Cathode) A cathode was prepared by the following method. As a cathode active material, $Li_{1.85}Ni_{0.18}Co_{0.10}Mn_{0.87}O_3$ (x=0.3, α=0.40, β=0.22 and γ=0.38) was used. A cathode slurry was prepared by blending the cathode active material, acetylene black as a conductive additive and PVDF as a binder together in a mass ratio of 90:5:5, and then adding and mixing thereto N-methylpyrrolidone as a solvent. An aluminum foil was used as a current collector. The obtained cathode slurry was applied thereto to a thickness of 30 μm, and was sufficiently dried, so as to obtain the desired cathode.

(Preparation of Electrolytic Solution) As listed in table 1, the specific aliphatic compounds were used. They were mixed and dissolved in 1 M $LiPF_6$ solution in EC:DEC (1:2 v/v %) in an amount of 1 mass % to obtain electrolytic solutions of respective examples.

(Preparation of Battery) The anode and cathode as prepared above were placed opposite to each other, and a 20 μm-thick polyolefin separator was disposed between them. This anode-separator-cathode laminate was disposed in a CR2032 coin-cell made of a stainless steel (SUS316). The electrolytic solution of each example was injected thereto, and the coin-cell was then sealed, so as to obtain a lithium ion secondary battery of each example.

Comparative Example 1

A battery of this comparative example was obtained by repeating the same procedure as Inventive Example 1 except that no aliphatic compound is added to the electrolytic solution.

Comparative Examples 2 to 7

As listed in table 1, the aliphatic compounds of the respective comparative examples were used. They were mixed and dissolved in 1 M $LiPF_6$ solution in EC:DEC (1:2 v/v %) in an amount of 1 mass % to obtain respective electrolytic solutions. Except for the above, lithium ion batteries of the respective comparative examples were obtained by repeating the same procedure as Inventive Example 1.
(Performance Evaluation)
(Charge-discharge Test of Electrodes) Cycling Characteristics Evaluation:
The lithium ion battery of each example was subject to a charge-discharge cycle test to examine the retention of the discharge capacity. That is, each battery was charged to 4.6 V under an environment of 30° C. by a constant current method (CC, current of 0.1C). After being rested for 10 minutes, each battery was then discharged to 2 V at a constant current (CC, current of 0.1C). The capacity retentions after 100 cycles are also shown in table 1.

TABLE 1

Type of Additive and Retention after 100 Cycles

| | Compound name | Type | Number of Acidic Groups | Retention after 100 Cycles |
|---|---|---|---|---|
| Comparative Example 1 | None | | None | 72% |
| Comparative Example 2 | EDTA | Aminocarboxylic acid | 4 | 0% |
| Comparative Example 3 | Acetic acid | Aliphatic low-molecular-weight compound | 1 | 0% |
| Comparative Example 4 | Succinic acid | Aliphatic low-molecular-weight compound | 2 | 22% |
| Comparative Example 5 | Telephthalic acid | Aromatic low-molecular-weight compound | 2 | 0% |
| Comparative Example 6 | 1,3,5-Benzene tricarboxylic acid | Aromatic low-molecular-weight compound | 3 | 15% |
| Comparative Example 7 | Pyromellitic acid | Aromatic low-molecular-weight compound | 4 | 30% |
| Inventive Example 1 | Citric acid | Aliphatic low-molecular-weight compound | 3 | 78% |
| Inventive Example 2 | Cyclobutane tetracarboxylic acid | Alicyclic low-molecular-weight compound | 4 | 74% |
| Inventive Example 3 | Cyclopentane tetracarboxylic acid | Alicyclic low-molecular-weight compound | 4 | 76% |
| Inventive Example 4 | Polyacrylic acid, Mw 100000 | Aliphatic high-molecular-weight compound | 2000 | 81% |
| Inventive Example 5 | Polyacrylic acid, Mw 250000 | Aliphatic high-molecular-weight compound | 5000 | 79% |
| Inventive Example 6 | Polyacid, Mw 450000 | Aliphatic high-molecular-weight compound | 10000 | 80% |
| Inventive Example 7 | Polyacid, Mw 1000000 | Aliphatic high-molecular-weight compound | 20000 | 76% |

Table 1 shows the relationship between the number of carboxylic acid groups of the compounds (additives) in a molecule and the capacity retention after 100 cycles of the respective batteries using the electrolytic solutions containing the additives. As can be seen from the table, an improvement of the capacity retention after 100 cycles was observed when the number of carboxylic acid groups in a molecule is equal to or greater than 3 and an aliphatic compound is used.

FIG. 1 illustrates the relationship between the number of carboxylic acid groups of the compounds (additives) in a molecule and the capacity retention after 100 cycles of the respective batteries using the electrolytic solutions containing the compounds. In the FIGURE, aliphatic carboxylic compounds are plotted by the square dots, and aromatic carboxylic compounds are plotted by the round dots. Further, the retention after 100 cycles of the battery without any additive is shown by the dotted line.

As can be seen from the FIGURE, an improvement of the capacity retention after 100 cycles was observed when the number of carboxylic acid groups in a molecule is equal to or greater than 3 and an aliphatic compound is used. Further, the result of a sample using EDTA, which is known as an additive for Mn elution at spinel cathodes, is plotted by the triangular dot. When EDTA was used as in the prior art, the battery performance was greatly degraded compared to a sample without any additive. It was revealed that EDTA is not always applicable to solid solution cathodes although it is applicable to spinel cathodes.

While the present invention was described with some embodiment and examples, the present invention is not limited thereto, and various changes can be made without departing from the gist of the present invention. For example, while the inventive examples are lithium ion secondary batteries, it is apparent that the present invention is not limited thereto but is also applicable to other electric devices such as capacitors.

The invention claimed is:
1. An electrolytic solution for a lithium ion secondary battery, containing:
   a lithium salt electrolyte;
   an organic solvent; and
   an aliphatic compound having three or more carboxylic acid groups in a molecule, wherein the lithium salt electrolyte and the aliphatic compound are dissolved in the organic solvent and the aliphatic compound is at least one selected from the group consisting of citric acid, cyclobutene tetracarboxylic acid and cyclopentane tetracarboxylic acid.
2. The electrolytic solution for the lithium ion secondary battery according to claim 1, wherein a content of the aliphatic compound is within a range from 0.1 to 3 mass %.

3. The electrolytic solution for the lithium ion secondary battery according to claim 1, wherein the aliphatic compound is one or more of cyclobutane tetracarboxylic acid and cyclopentane tetracarboxylic acid.

4. The electrolytic solution for the lithium ion secondary battery according to claim 1, further comprising an additive that forms a solid electrolyte interphase (SEI) coating on a surface of an anode active material.

5. The electrolytic solution for the lithium ion secondary battery according to claim 4, wherein the additive is one or more of organic sulfone compounds, organic disulfone compounds, vinylene carbonate derivatives, ethylene carbonate derivatives, ester derivatives, divalent phenol derivatives, terphenyl derivatives, and phosphate derivatives.

6. An electrolytic solution for a lithium ion secondary battery, containing:
   a lithium salt electrolyte;
   an organic solvent; and
   an aliphatic compound having three or more carboxylic acid groups in a molecule, wherein the aliphatic compound has a molecular weight within a range from 100,000 to 450,000 wherein the lithium salt electrolyte and the aliphatic compound are dissolved in the organic solvent.

7. The electrolytic solution for the lithium ion secondary battery according to claim 6, wherein a content of the aliphatic compound is within a range from 0.1 to 3 mass %.

8. The electrolytic solution for the lithium ion secondary battery according to claim 6, further comprising an additive that forms a solid electrolyte interphase (SEI) coating on a surface of an anode active material.

9. The electrolytic solution for the lithium ion secondary battery according to claim 8, wherein the additive is one or more of organic sulfone compounds, organic disulfone compounds, vinylene carbonate derivatives, ethylene carbonate derivatives, ester derivatives, divalent phenol derivatives, terphenyl derivatives, and phosphate derivatives.

* * * * *